United States Patent
Steenhof et al.

(10) Patent No.: US 7,260,220 B2
(45) Date of Patent: Aug. 21, 2007

(54) ADAPTIVE WATERMARKING

(75) Inventors: Frits Anthony Steenhof, Eindhoven (NL); Gerrit Cornelis Langelaar, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 154 days.

(21) Appl. No.: 10/532,911

(22) PCT Filed: Sep. 22, 2003

(86) PCT No.: PCT/IB03/04236

§ 371 (c)(1),
(2), (4) Date: Apr. 27, 2005

(87) PCT Pub. No.: WO2004/040911

PCT Pub. Date: May 13, 2004

(65) Prior Publication Data

US 2006/0072750 A1    Apr. 6, 2006

(30) Foreign Application Priority Data

Oct. 30, 2002    (EP) .................................. 02079549

(51) Int. Cl.
*H04N 7/167* (2006.01)

(52) U.S. Cl. ...................... 380/217; 380/200; 713/179; 382/100; 370/231

(58) Field of Classification Search ................ 382/100; 380/200, 217; 370/231; 713/179
See application file for complete search history.

(56) References Cited

U.S. PATENT DOCUMENTS

| | | | |
|---|---|---|---|
| 5,809,139 A * | 9/1998 | Girod et al. ................. | 380/202 |
| 6,208,745 B1 * | 3/2001 | Florencio et al. ........... | 382/100 |
| 6,404,926 B1 * | 6/2002 | Miyahara et al. ........... | 382/232 |
| 6,639,996 B2 * | 10/2003 | Suda ........................... | 382/100 |
| 6,798,894 B2 * | 9/2004 | Rhoads ........................ | 382/100 |
| 2003/0210651 A1 * | 11/2003 | Tzeng et al. ................. | 370/231 |

FOREIGN PATENT DOCUMENTS

| | | |
|---|---|---|
| EP | 0782341 | 7/1997 |
| EP | 1139660 A | 10/2001 |
| WO | WO 02/060182 A1 | 8/2002 |

* cited by examiner

*Primary Examiner*—Taghi T. Arani
(74) *Attorney, Agent, or Firm*—Paul Im

(57) ABSTRACT

A method and apparatus (200) for embedding a watermark in an information signal bit-stream are described. The method comprises receiving a portion of an information signal bit-stream (MPEG2). A first copy of the received portion is stored in a first buffer (220). A second copy of the received portion is watermarked, and the resulting watermarked signal stored in a second buffer (240). At predetermined intervals, a check is performed to determine if the bit-rate of the received portion has been changed by being watermarked. If the check determines the bit-rate has changed, the first copy of the received portion from the first buffer is output. Otherwise the watermarked signal from the second buffer is output.

10 Claims, 2 Drawing Sheets

ADAPTIVE WATERMARKING

FIELD OF THE INVENTION

The present invention relates to methods and apparatus suitable for embedding a watermark in an information signal bit-stream, and in particular is particularly suited, but not limited, to information watermarking signals which are compressed. A typical example of such a compressed information signal is an MPEG2 video signal.

BACKGROUND OF THE INVENTION

Watermarking of information signals is a technique for the transmission of additional data along with the signal. For instance, watermarking techniques can be used to embed copy write and copy control information into video signals.

U.S. Pat. No. 5,809,139 describes a digital watermarking method and apparatus for the watermarking of a digital video signal in a compressed form. To allow the system to be used with transmission channels having strict bit-rate constraints, the system also includes bit-stream control to prevent an increase in the bit-rate of the video signal. For each transform coefficient of the video signal, it is determined whether more bits will be necessary to encode a watermarked version of the coefficient than an un-watermarked coefficient. If more bits are required to transmit a watermark coefficient, then the un-watermarked coefficient is output. Such a method can be used to watermark a MPEG2 video Elementary Stream (E.S.).

Equally, a method described in WO 02/060182, by which a watermark is embedded by selectively discarding the smallest quantized DCT (Distribute Cosine Transform) coefficients, can be used to provide a watermarked signal that is either the same bit-rate as, or a lower bit-rate than, the original signal. This lower bit-rate can be raised back to the original bit-rate by accumulating a relatively large amount of data sufficient to form one or more packets, and stuffing the packet(s) with zero bits.

However, such methods are not appropriate for watermarking information bit-streams that are defined on the system level, for instance a Transport Stream (T.S.), as for instance used in Digital Video Broadcasting (DVB), or a Program Stream (P.S.), as for instance used in Digital Versatile Disk (DVD).

In T.S. and P.S., bit-rate control is more difficult because the elementary stream information is interrupted at random places by other data, such as other video stream(s), audio steam(s), system data, and timing data. In order to prevent distortion of the resulting video signal, it is important that the bit-rate control is such that the position of the start code in the compressed video stream does not change upon the watermarling applied. Equivalently, it is desirable that the number of bits between start codes does not change due to the watermark being applied to the signal. For instance, in MPEG a change of the number of bits between start codes would result in system timing errors and/or result in buffer over or under flow upon decoding of the bit-stream.

It is an aim of embodiments of the present invention to provide methods and apparatus suitable for applying a watermark to an information bit-stream without changing the bit-rate of the information signal.

It is a further aim of embodiments of the present invention to provide methods and apparatus for watermarking a Program Stream or a Transport Stream such that the position of start codes in the bit-stream does not change.

SUMMARY OF THE INVENTION

In a first aspect the present invention provides a method of embedding a watermark in an information signal bit-stream, the method comprising the steps of: receiving a portion of an information signal bit-stream; storing a first copy of the received portion in a first buffer; watermarking a second copy of the received portion; storing the resulting watermarked signal in a second buffer; performing a check at predetermined intervals to determine if the bit-rate of the received portion has been changed by being watermarked; and outputting the first copy of the received portion from the first buffer if the check determines the bit-rate has changed, otherwise outputting the watermarked signal from the second buffer.

By utilising such a scheme, the bit-rate of the output signal can be maintained at the same bit-rate as the input signal. Further, by appropriate selection of the predetermined intervals, it is possible to ensure that positions of start codes in the bit-stream do not change.

In another aspect, the present invention provides a computer program arranged to perform the method as described above.

In a further aspect, the present invention provides a record carrier comprising a computer program as described above.

In another aspect, the present invention provides a method of maling available for downloading a computer program as described above.

In a further aspect the present invention provides a watermarked information signal formed according to the method as described above.

In another aspect the present invention provides a record carrier comprising a watermarked information signal as described above.

In a further aspect the present invention provides an apparatus for embedding a watermark in an information signal bit-stream, the apparatus comprising: a receiver for receiving a portion of an information signal bit-stream; a first buffer for storing a first copy of the received portion; a watermarker for watermarking a second copy of the received portion; a second buffer for storing the resulting watermarked signal; a controller arranged to perform a check at predetermined intervals to determine if the bit-rate of the received portion has been changed by the watermarking process; and a multiplexer arranged to output the first copy of the received portion from the first buffer if the check determines the bit-rate has changed, and otherwise to output the watermarked signal from the second buffer.

Other aspects of the information will be apparent from the dependent claims.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENT

The present invention utilises two buffers. An information bit-stream is received, and one copy of the bit-stream is stored in a first buffer. A second copy of the same portion of the information bit-stream is also stored in the second buffer. The contents of the second buffer are watermarked. This watermarking can be performed whilst the signal is stored in the buffer, or prior to the signal being input to the buffer. The watermarking can be an initial watermarking of the signal, or alternatively a remarking of the signal (e.g. to change a "copy once" to a "no copy" signal for copy control).

If, at a predetermined decision moment, the size of the bit-stream stored in the second buffer is equal to the size of the equivalent bit-stream stored in the first buffer, then the contents of the second buffer is output. Otherwise, the contents of the first buffer is used as the output.

Such a method allows the bit-rate of the output signal to be maintained at the same rate as the input signal, whilst still applying a watermark to at least portions of the signal.

This methodology is particularly appropriate for packetised signal streams, in which packets are restricted in size (either to a fixed size, or restricted to complete words). Normally, to ensure that the bit-rate would be maintained, large buffers would be required to collect enough data to finalise a packet. However, the present invention allows two smaller buffers to be utilised, with decisions being made on whether the bit-rate is maintained by looking at predetermined portions of each packet. Consequently, a large, relatively expensive, memory buffer is not required.

If desired, a combination (e.g. random) of the contents of the first and second buffer can be output, as long as the output represents a valid stream at the same bit-rate as the original signal.

An MPEG2 video signal represents one example of such a packetised transport bit-stream.

MPEG signals are typically formed by dividing each video image into blocks of 8×8 pixels, each pixel block being discrete cosine transformed into a respective block of DCT coefficients. In an MPEG2 elementary video stream, a number of DCT luminance blocks and chrominance DCT blocks constitute a macro block, a number of macro blocks constitutes a slice, a number of slices constitutes a picture (field or frame), and a series of pictures constitutes a video sequence. Some pictures are autonomously encoded (I-pictures), other pictures are predictively encoded with motion compensation (P- and B-pictures). In P- and B-pictures, the DCT coefficients represent differences between pixels of the current picture and pixels of one or more reference pictures, rather than the pixels themselves.

Figure 1:
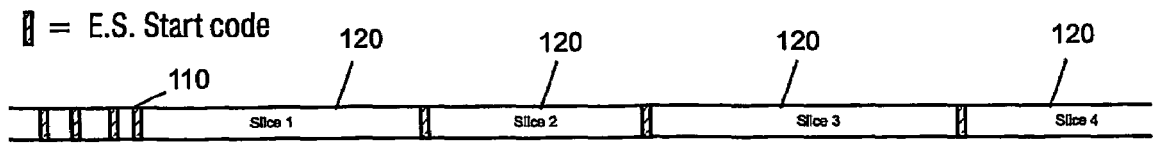
FIG. 1 illustrates start code positions at different levels of MPEG2 bit-streams: A is an Elementary Stream, B is a Packetised Elementary Stream, C1 is a Program Stream, and C2 is a Transport Stream.
Figure 1:
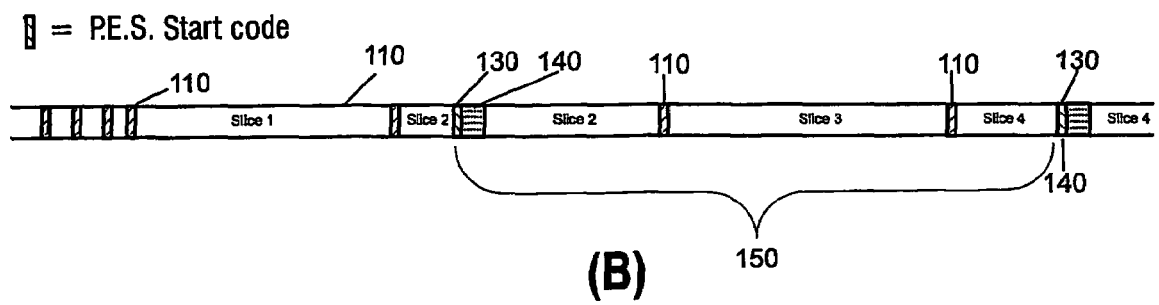
Figure 1:
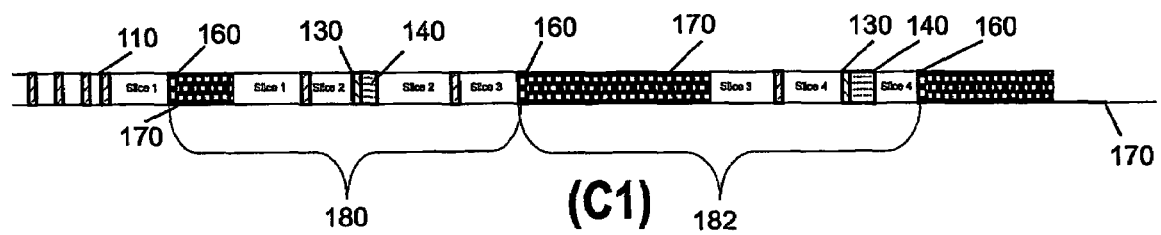
Figure 1:
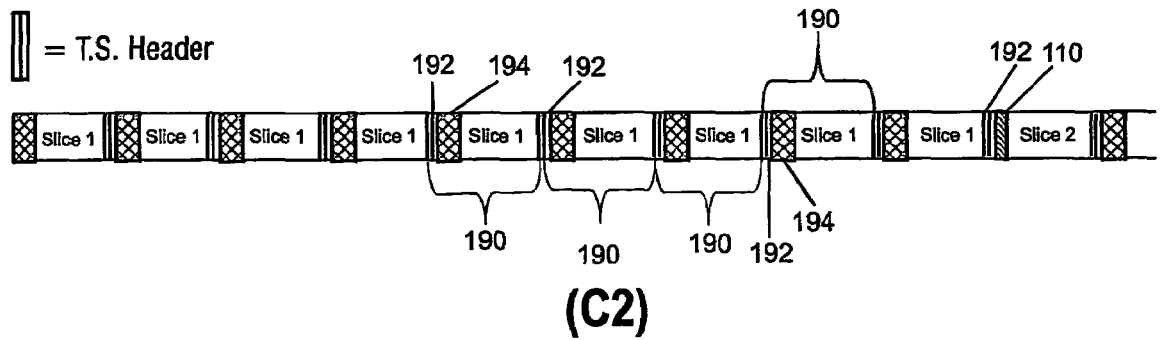

FIG. 1 illustrates a video elementary stream (ES) A, a packetised elementary stream (PES) B incorporating the elementary stream, a program stream (PS) C1 incorporating the packetised elementary stream, and a transport stream (TS) C2 incorporating the packetised elementary stream. The bit-rates of C1 and C2 are both higher than B, and the bit-rate of B is higher than A.

The elementary stream can be seen to comprise a plurality of slices 120 (slice 1, slice 2, slice 3, slice 4), the data for each slice being separated by an ES start code 110. The slices 120 each have a respective, non-uniform length i.e. slice 1 is longer than slice 2.

In order to realise a complete system, the video data needs to be time multiplexed with other data, such as audio streams, system timing information, conditional access data etc. To allow this to occur, the original video elementary stream is cut into packets. The ES can be cut at any random position. Consequently, this may result in a variable length code (VLC) that is split into two portions.

As indicated in B, each PES packet is separated from the adjacent packet by a PES start code. Each PES packet starts with a PES header, which includes decoder timing reference data. The packet 150 is an example of a packet within the PES stream. The packet 150 can be seen to include a PES start code 130, a PES header 140, as well as portions of various slices (the latter portion of slice 2, all of slice 3, and the initial portion of slice 4), each slice being separated by a respective ES start code 110.

On a system level, PES packets are typically time multiplexed with other data, which results in either a transport stream C2 as is used for instance in DVB or a program stream C1 as is used for instance in DVD. PES packets are each typically up to 16 kBytes in size.

Streams C1 and C2 in FIG. 1 are typical examples of respectively a program stream and a transport stream in which the original elementary stream has been time multiplexed. It will be noted that PES packets can be interrupted, and cut into two or more portions at random positions, by other packets on the program stream level.

For instance, in the PS example (C1) shown, each program stream packet is separated by a respective start code 160. Following each start code, additional data packet(s) 170 have been inserted into the PS packets 180, 182. PS packets are typically each of the order of several kBytes in size. Each PS packet further contains one or more portions of the PES packets e.g. PS packet 180 contains a start code 160, an additional data packet 170, a portion of slice 1, separated by an ES start code from a portion of slice 2, which is in turn separated by the PES start code 130 and PES header 140 from the remainder of slice 2, which is in turn separated by a further ES start code from the start of a portion of slice 3.

In the TS example (C2) shown, each TS packet 190 comprises a header 192 followed by a payload. TS packets are typically of a fixed, predetermined length with the TS header typically being of length 4 Bytes, and the payload 184 Bytes, so as to give a total packet length of 188 Bytes. The TS payload is thus a fraction of the length of a PES packet. As can be seen in FIG. 1, slice 1 is thus split across several TS packets, as it is too large to be accommodated within a single TS packet. The payload may comprise information from the PES, along with additional system information 194.

During the encoding process, special rules are utilised to ensure that the start codes are unique at each compressed stream level. For instance, in MPEG a start code consists of 23 logical "0", followed by a logical "1" (in hexadecimal notation 0x00 00 01). If the position of the start codes are changed, this is likely to result in errors upon decoding e.g. due to changing the system timing, resulting in buffer underflow or overflow.

A preferred embodiment of the present invention will now be described. The preferred embodiment makes use of two buffers, with the original incoming stream (without a watermark) being stored in a first buffer, and the remarked stream (with a watermark added) being stored in the second buffer. After a predetermined time, which is maximally after the information signal has filled the buffers, it is decided to output data either from buffer 1 (unmarked data) or from buffer 2 (remarked data). The buffer selection is based on the fact on whether it is possible or not to restore the bit-rate (i.e. arrive at a zero bit budget value at the decision moment). As will be seen by the below embodiment, decision moments are typically at a slice level (e.g. at the start or end of each slice).

In the embodiment, it is assumed that a watermark is added to a respective compressed video stream by using the run-merge algorithm described, for instance, in WO 02/060182. During the processing of data, the run-merge algorithm discards bits and consequently can reduce the bit-rate. The total number of discarded bits at any moment during processing is stored, and is termed the "bit budget".

It will be appreciated that other watermarking systems could equally be used that can be applied so as to maintain and/or reduce the number of bits within an information signal.

Figure 2:
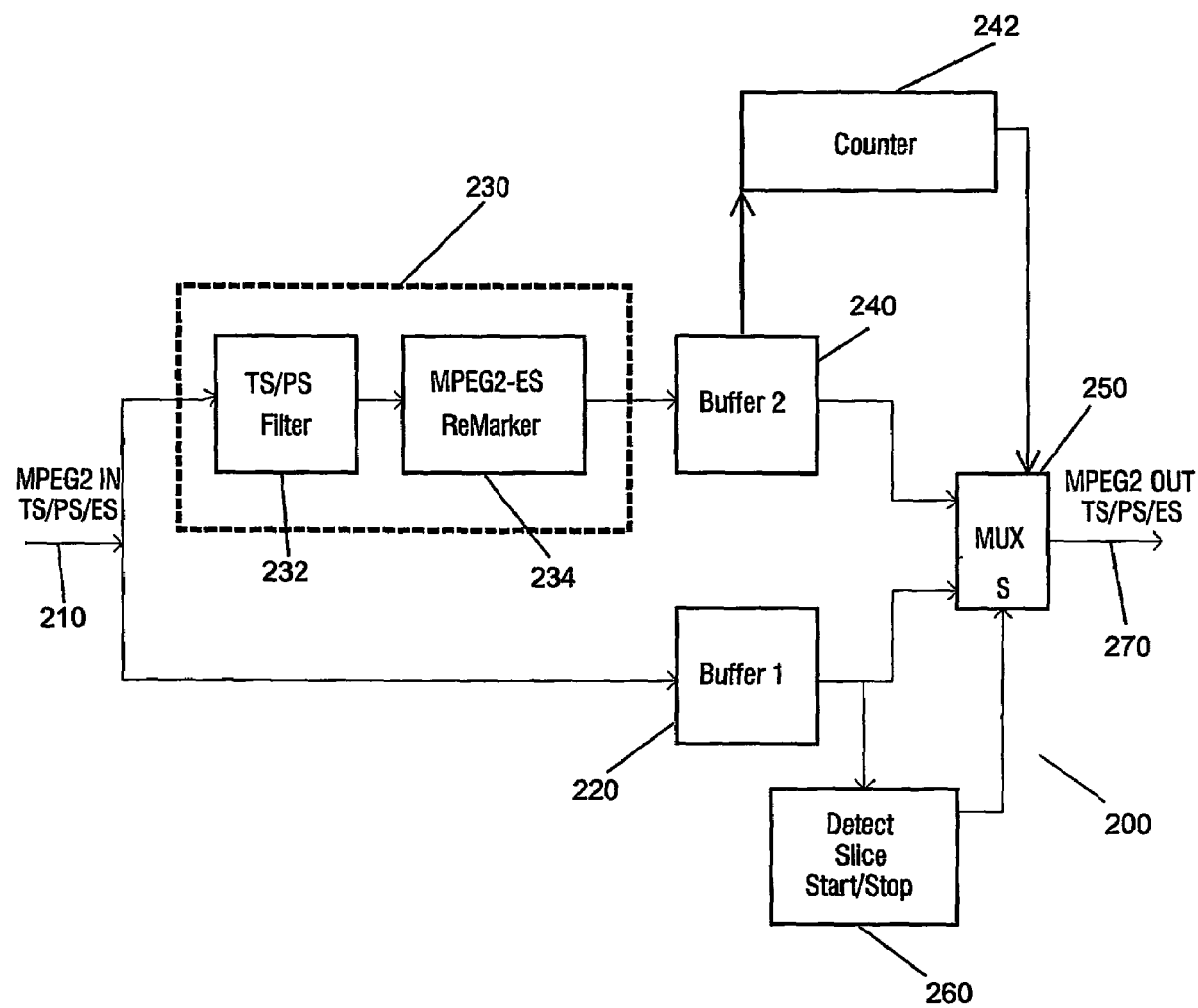
FIG. 2 is a schematic diagram of a remarking apparatus in accordance with an embodiment of the present invention.

FIG. 2 illustrates a watermarking apparatus suitable for watermarking an MPEG2 information bit-stream in accordance with the preferred embodiment of the present invention. The apparatus in this particular embodiment is termed a "remarker", as it is used to add a watermark to a signal that has already been watermarked. However, the apparatus could also be used to apply a first watermark to an information signal.

The incoming information bit-stream is received at input 210. One copy of the incoming stream is passed to buffer 1 220, which acts as a normal FIFO (First In First Out) buffer.

A second copy of the incoming bit-stream is passed, via watermark embedding apparatus 230, to buffer 2 240 (which is also a FIFO). The second buffer 240 thus acts to store parts of the remarked compressed video stream.

In this embodiment, the buffers are of identical size, and are sized such that normally one or more slices can be stored in each buffer. Preferably, the buffers are sized such that an integral number of slices can be stored in each buffer. Simulations show that, for MPEG2, a buffer size of approximately 2-4 kByte is appropriate.

The watermark embedding apparatus 230 consists of a filter 232 and a remarker 234. The filter 232 acts to remove the information specific to the system level of the stream (i.e. the TS or PS specific start codes and/or data), and to leave the ES specific data. The remarker 234 acts to embed the watermark into the ES data, in accordance with the above-discussed run-merge algorithm, and then to add back in the relevant TS/PS data that had been removed by the filter 232, and to output the resulting watermarked version of the original bit-stream to buffer 240.

A counter 242 is connected to buffer 240. The counter is incremented each time that a remarked slice is completely stored in buffer 2. The same counter decrements each time that a remarked slice is removed from buffer 2.

A start code detector is connected to the output of buffer 1. At the instant that a new slice start is detected at the output to buffer 1, a check is made on whether the equivalent slice is already completely present in buffer 2 (i.e. the counter value should not be 0).

A multiplexer is connected to the outputs of both buffers 220, 240. The multiplexer operates to selectively output (to output 270) the contents of either buffer 1 or buffer 2, based upon the counter value 242 and the slice start detector 260.

If the value of the counter 242 is more than 0 when a new slice is detected, the output multiplexer will select data from buffer 2 240, and thus a remarked (watermarked) slice will be output.

If the counter value is 0 at the moment that a slice start is detected to the output of buffer 1, the output multiplexer will select data from buffer 1, and thus unmarked data will be output.

In either case, the equivalent portion of the output signal is also removed from the other buffer, to stop redundant data accumulating.

It will be appreciated that the number of slices not watermarked will be dependent upon buffer size. For instance, the number of unmarked slices will be higher for relatively small buffer sizes (e.g. 2 kByte), and also for large slice sizes (e.g. for I-pictures at high bit-rates).

Various embodiments of the present invention will be apparent to the skilled person. For instance, the watermark can be applied to the information bit-stream by transcoding (i.e. direct application of the watermark to the bit stream), such that the bit stream does not have to be decoded and re-encoded to add the watermark.

It will be appreciated by the skilled person that various implementations not specifically described will be understood as falling within the scope of the present invention. For instance, whilst only the functionally of the embedding apparatus has been described, it will be appreciated that the apparatus could be realised as a digital circuit, an analog circuit, a computer program or a combination thereof.

Such computer programs, as well as any watermarked signals generated by the embedding method of the present invention, can be stored on any machine readable medium (e.g. a computer memory, a floppy disk, a compact disc or the equivalent), or can be transmitted along any transmission medium, including both wireless and wireline medium. The term record carrier in the present specification is taken to include both such machine readable medium and such transmission medium.

Within the specification it will be appreciated that the words "comprising" does not exclude other elements or steps, that "a" or "an" does not exclude a plurality, and that a single processor or other unit may fulfil the functions of several means recited in the claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of embedding a watermark in an information signal bit-stream, the method comprising the steps of: receiving a portion of an information signal bit-stream; storing a first copy of the received portion in a first buffer; watermarking a second copy of the received portion; storing the resulting watermarked signal in a second buffer; performing a check at predetermined intervals to determine if the bit-rate of the received portion has been changed by being watermarked; and outputting the first copy of the received portion from the first buffer if the check determines the bit-rate has changed, otherwise outputting the watermarked signal from the second buffer;

wherein said information signal bit-stream comprises a series of packets, the predetermined interval corresponding to the first buffer receiving an integral number of said packets.

2. A method as claimed in claim 1, wherein said watermarking step comprises embedding a watermark in the second copy of the received portion by transcoding.

3. A method as claimed in claim 1, wherein said information signal comprises at least one of a transport stream and a program stream.

4. A method of embedding a watermark in an information signal bit-stream, the method comprising the steps of: receiving a portion of an information signal bit-stream;

storing a first copy of the received portion in a first buffer; watermarking a second copy of the received portion; storing the resulting watermarked signal in a second buffer; performing a check at predetermined intervals to determine if the bit-rate of the received portion has been changed by being watermarked; and outputting the first copy of the received portion from the first buffer if the check determines the bit-rate has changed, otherwise outputting the watermarked signal from the second buffer;

wherein said predetermined interval is when a predetermined start code of the bit-stream is detected at a predetermined position within the first buffer.

5. A method of embedding a watermark in an information signal bit-stream, the method comprising the steps of: receiving a portion of an information signal bit-stream; storing a first copy of the received portion in a first buffer; watermarking a second copy of the received portion; storing the resulting watermarked signal in a second buffer; performing a check at predetermined intervals to determine if the bit-rate of the received portion has been changed by being watermarked; and outputting the first copy of the received portion from the first buffer if the check determines the bit-rate has changed, otherwise outputting the watermarked signal from the second buffer;

wherein said predetermined interval corresponds to at least one of the buffers being filled by a respective stored signal.

6. A computer program stored on a computer readable storage medium arranged to perform a method comprising the steps of:

receiving a portion of an information signal bit-stream;
    storing a first copy of the received portion in a first buffer;
    watermarking a second copy of the received portion;
    storing the resulting watermarked signal in a second buffer;
    performing a check at predetermined intervals to determine if the bit-rate of the received portion has been changed by being watermarked; and
    outputting the first copy of the received portion from the first buffer if the check determines the bit-rate has changed, otherwise outputting the watermarked signal from the second buffer;
    wherein said information signal bit-stream comprises a series of packets, the predetermined interval corresponding to the first buffer receiving an integral number of said packets.

7. A machine readable storage medium comprising a computer program configured to instruct a machine to perform the steps of receiving a portion of an information signal bit-stream;

storing a first copy of the received portion in a first buffer;
    watermarking a second copy of the received portion;
    storing the resulting watermarked signal in a second buffer;
    performing a check at predetermined intervals to determine if the bit-rate of the received portion has been changed by being watermarked; and
    outputting the first copy of the received portion from the first buffer if the check determines the bit-rate has changed, otherwise outputting the watermarked signal from the second buffer;
    wherein said information signal bit-stream comprises a series of packets, the predetermined interval corresponding to the first buffer receiving an integral number of said packets.

8. A method, the method including making available for downloading a computer program configured to instruct a machine to perform the steps of receiving a portion of an information signal bit-stream; storing a first copy of the received portion in a first buffer; watermarking a second copy of the received portion; storing the resulting watermarked signal in a second buffer; performing a check at predetermined intervals to determine if the bit-rate of the received portion has been changed by being watermarked; and outputting the first copy of the received portion from the first buffer if the check determines the bit-rate has changed, otherwise outputting the watermarked signal from the second buffer; wherein said information signal bit-stream comprises a series of packets, the predetermined interval corresponding to the first buffer receiving an integral number of said packets.

9. A method of generating a watermarked information signal comprising the steps of:

receiving a portion of an information signal bit-stream;
    storing a first copy of the received portion in a first buffer;
    watermarking a second copy of the received portion;
    storing the resulting watermarked signal in a second buffer;
    performing a check at predetermined intervals to determine if the bit-rate of the received portion has been changed by being watermarked; and
    outputting the first copy of the received portion from the first buffer if the check determines the bit-rate has changed, otherwise outputting the watermarked signal from the second buffer;
    wherein said information signal bit-stream comprises a series of packets, the predetermined interval corresponding to the first buffer receiving an integral number of said packets.

10. An apparatus for embedding a watermark in an information signal bit-stream, the apparatus comprising:

a receiver for receiving a portion of an information signal bit-stream;
    a first buffer for storing a first copy of the received portion;
    a watermarker for watermarking a second copy of the received portion;
    a second buffer for storing the resulting watermarked signal;
    a controller arranged to perform a check at predetermined intervals to determine if the bit-rate of the received portion has been changed by the watermarking process; and
    a multiplexer arranged to output the first copy of the received portion from the first buffer if the check determines the bit-rate has changed, and otherwise to output the watermarked signal from the second buffer;
    wherein said information signal bit-stream comprises a series of packets, the predetermined intervals corresponding to the first buffer receiving an integral number of said packets.

* * * * *